(12) United States Patent
Shimomura et al.

(10) Patent No.: US 7,379,671 B2
(45) Date of Patent: May 27, 2008

(54) OPTICAL TRANSMITTER

(75) Inventors: Kenkichi Shimomura, Tokyo (JP); Takashi Sugihara, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/609,366

(22) Filed: Jul. 1, 2003

(65) Prior Publication Data

US 2004/0071474 A1 Apr. 15, 2004

(30) Foreign Application Priority Data

Oct. 11, 2002 (JP) ............................. 2002-298727

(51) Int. Cl.
*H04J 13/02* (2006.01)
*H04B 10/04* (2006.01)
*G02F 1/00* (2006.01)
*G02F 1/01* (2006.01)
*H04B 10/12* (2006.01)

(52) U.S. Cl. ..................... 398/92; 398/197; 398/198; 398/188

(58) Field of Classification Search ............... 398/197, 398/198, 92, 188
See application file for complete search history.

(56) References Cited

U.S. PATENT DOCUMENTS 5,228,043 A * 7/1993 Naito et al. ................. 372/32
5,305,134 A * 4/1994 Tsushima et al. ........... 398/91
6,072,615 A 6/2000 Mamyshev
6,459,519 B1 * 10/2002 Sasai et al. ................. 398/183
6,650,846 B1 * 11/2003 Ito ............................. 398/184
2002/0021464 A1 * 2/2002 Way ........................... 359/124
2002/0131134 A1 * 9/2002 Hait ............................ 359/181

(Continued)

FOREIGN PATENT DOCUMENTS

EP        0 977 382 A2      2/2000

(Continued)

OTHER PUBLICATIONS

Miyamoto Y et al.: "Duobinary carrier-suppressed return-to-zero formal and its application to 100GHz-spaced 8×43 Gbit/s DWDM unrepeatered transmission over 163 km" Optical Fiber Communication Conference. (OFC). Technical Digest Postconference Edition. Anaheim, CA, Mar. 17-22, 2001, Trends in Optics and Photonics Series. Tops. vol. 54, Washington, WA : OSA, US, vol. 2, Mar. 17, 2001, pp. TuU4-1, XP010545838 ISBN: 1-55752-655-9.

(Continued)

*Primary Examiner*—Jason Chan
*Assistant Examiner*—Wai Lun Leung
(74) *Attorney, Agent, or Firm*—Birch, Stewart, Kolasch & Birch, LLP

(57) ABSTRACT

An optical modulation processing section is provided which, in turn, includes a signal carrier-suppressed pulse modulating unit that performs signal carrier-suppressed pulse modulation on a light source signal to thereby create a CS-RZ signal, a phase modulating unit that performs phase modulation on a data signal based on the CS-RZ signal to thereby convert the data signal to a phase-modulated signal, and an optical filtering unit that filters out redundant frequency components included in the phase modulation signal.

10 Claims, 8 Drawing Sheets

U.S. PATENT DOCUMENTS

2003/0219259 A1* 11/2003 Martensson et al. ........ 398/188

FOREIGN PATENT DOCUMENTS

| EP | 1 298 819 A2 | 4/2003 |
|---|---|---|
| JP | 9-236781 A | 9/1997 |
| JP | 2001-308792 A | 11/2001 |
| JP | 2002-164850 A | 6/2002 |
| JP | 2002-281095 A | 9/2002 |
| JP | 2004-104385 A | 4/2004 |

OTHER PUBLICATIONS

Idler et al., 0.8bit/s/Hz of Information Spectral Density by Vestigial Sideband Filtering of 42.66 Gb/s NRZ., Sep. 8, 2002.

Morita et al., 100% Spectral-Efficient 25×42.7 GBIT/S Transmission Using Asymmetrically Filtered CS-RZ Signal and a Novel Crosstalk Suppressor, KDDI R&D Laboratories Inc. Japan, Post-deadline session 4: PD4.7, Sep. 8, 2002.

* cited by examiner

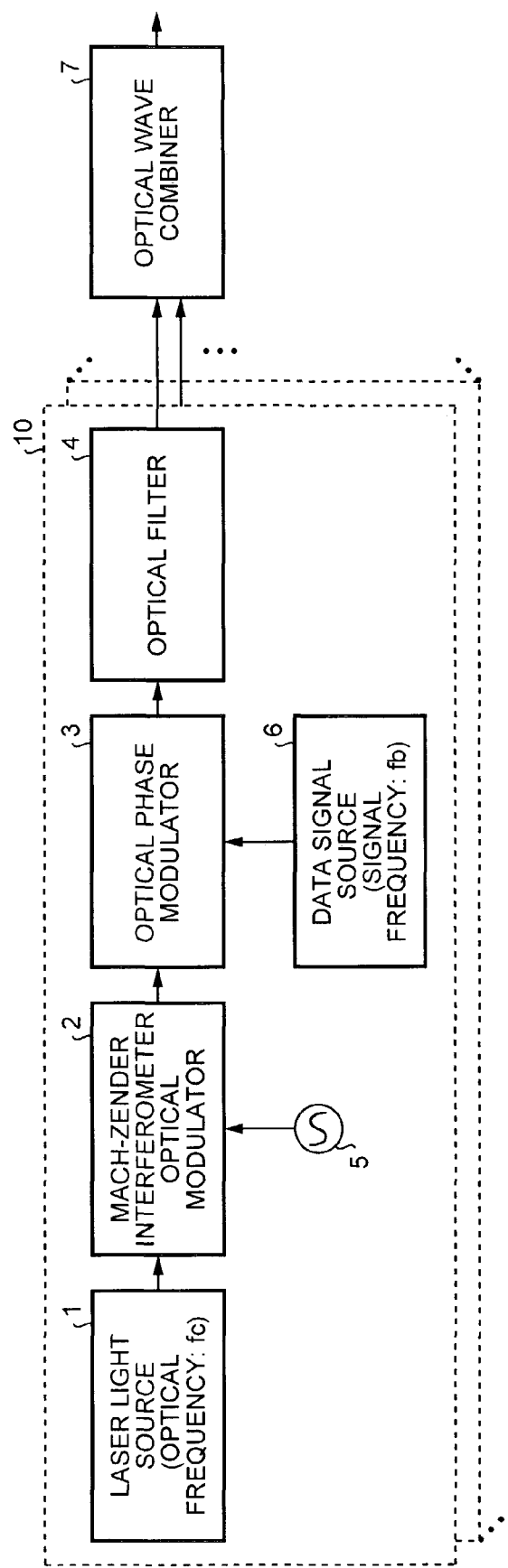

WAVELENGTH-MULTIPLEXED SPECTRUM
(WHEN REDUNDANT FREQUENCY COMPONENTS ARE FILTERED OUT)

SIGNAL EYE PATTERN
(WHEN REDUNDANT FREQUENCY COMPONENTS ARE FILTERED OUT)

WAVELENGTH-MULTIPLEXED SPECTRUM
(WHEN REDUNDANT FREQUENCY COMPONENTS ARE NOT FILTERED OUT)

OUTPUT SIGNAL OF MACH-ZENDER OPTICAL MODULATOR

OUTPUT SIGNAL OF CYCLIC FILTER

OUTPUT SIGNAL OF OPTICAL WAVE COMBINER

OPTICAL TRANSMITTER

BACKGROUND OF THE INVENTION

1) Field of the Invention

The present invention relates to an optical transmitter employed in an optical communications system.

2) Description of the Related Art

In a conventional optical communications system, intensity modulation is commonly carried out by a simple on-off keying method. An intensity modulator enhances not only the transmission speed of each wavelength but also the capacity of transmission by increasing the number of multiplexed wavelengths. As a result, in commercial systems the transmission speed per wavelength has increased to 10 Gbit/s and the number of wavelengths that can multiplexed (hereinafter, "multiplexed wavelengths") has increased to the tune of a few dozens.

In conventional on-off keying, it is necessary that the interval between two wavelengths be set greater than 2.5 times the bit rate, in order to avoid spectral overlap of two adjoining optical wavelength signals. Consequently, the frequency usage efficiency that is defined by the ratio of the wavelength interval and the signal frequency is limited to 0.4.

As a result, the conventional methods of increasing the transmission speed and the number of multiplexed wavelengths to increase the transmission capacity have their demerits. The transmission capacity cannot be improved unless the band of the transmission channel and the optical amplifier are dramatically broadened.

As a means of solving these problems, study results that relate to improvements in the bandwidth and the frequency usage efficiency of the optical fiber used in the optical transmission channel have been reported. Particularly, improved frequency usage efficiency can enhance the transmission capacity of the existing transmission channel and is cost-effective.

FIG. 9 shows the structure of a conventional optical transmitter (See "0.8 bit/s/Hz of Information Spectral Density by Vestigial Sideband Filtering of 42.66 Gb/s NRZ" W. Idler et al., in proceedings of European Conference on Optical communication 2002, 8.1.5. In this conventional optical transmitter, electrical non-return-to-zero (NRZ) signals that are to be transmitted are first converted to plural optical signals by on-off keying modulation process. The optical signals pass through cyclic filters 23-a and 23-b where the side band on one side of these optical signals are suppressed to vestigial side band (VSB), thereby narrowing the bandwidth occupied by each optical signal. Subsequently, an optical wave combiner 24 combines these optical signals and outputs them as wavelength-multiplexed signals.

As a result, for instance, a frequency usage efficiency to the tune of 0.8 bit/s/Hz can be achieved by wavelength-multiplexing an optical signal of 42.7 Gbit/s at an interval of 50 GHz, as shown in FIG. 10C. Further, in this example, the frequency usage efficiency is defined by obtaining a signal wavelength (40 Gbit/s) after deducting from it an error-correcting redundancy bit.

In the conventional optical amplifier, non-return-to-zero on-off keying format that has a relatively narrow bandwidth is used as a modulation format. Consequently, the signal reception sensitivity is low when compared with that of a return-to-zero (RZ) on-off keying format used in a long-distance communications system.

Although the return-to-zero on-off keying format has the advantage of high signal reception sensitivity, due to the high bandwidth of each optical signal, even after their side band is truncated, the bandwidth can still be up to twice that of the non-return-to-zero on-off keying format.

SUMMARY OF THE INVENTION

It is an object of the present invention to solve at least the problems in the conventional technology.

The optical transmitter according to one aspect of the present invention includes an optical modulation processing unit that has a signal carrier-suppressed pulse modulating unit that performs signal carrier-suppressed pulse modulation on a light source signal to thereby create a carrier-suppressed-return-to-zero signal; a phase modulating unit that performs phase modulation on a data signal based on the carrier-suppressed-return-to-zero signal to thereby convert the data signal into a phase-modulated signal; and an optical filtering unit that filters out redundant frequency components included in the phase-modulated signal.

The optical transmitter according to one aspect of the present invention includes an optical modulation processing unit that has a phase modulating unit that performs phase modulation on a data signal to thereby convert the data signal into a phase-modulated signal; a signal carrier-suppressed pulse modulating unit that performs signal carrier-suppressed pulse modulation on the phase-modulated signal to thereby convert the phase-modulated signal into a phase modulated carrier-suppressed-return-to-zero signal; and an optical filtering unit that filters out redundant frequency components included in the phase modulated carrier-suppressed-return-to-zero signal.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 is a schematic drawing of the optical transmitter according to a first embodiment of the present invention;

DETAILED DESCRIPTION

Figure 2A:
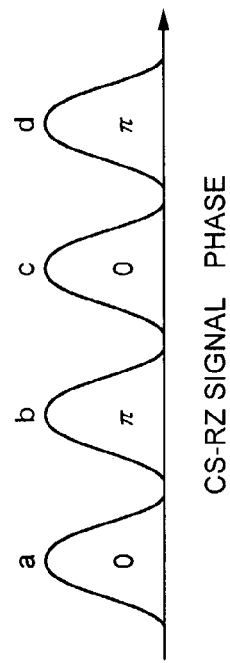
FIGS. 2A to 2D are explanatory drawings for explaining signal carrier-suppressed pulse modulation in the first embodiment.

Exemplary embodiments of a optical transmitter according to the present invention are explained below in detail with reference to the accompanying drawings. It should be noted that these embodiments are not intended to limit the present invention.

FIG. 1 is a schematic drawing of the optical transmitter according to a first embodiment of the present invention. The optical transmitter comprises a plurality of optical modulation processing sections 10. In each optical modulation processing section 10, a laser light source 1 outputs a light source signal of an optical frequency fc. The light source signal enters a Mach-Zender interferometer optical modulator 2 (hereinafter "MZI optical modulator") that performs signal carrier-suppressed pulse modulation on the entering light source signal and converts it into a carrier-suppressed RZ signal (hereinafter "CS-RZ signal"), based on a clock signal (of a frequency fb/2) that enters from a clock signal source 5.

An optical phase modulator 3 performs, based on the CS-RZ signal, phase modulation on a data signal (signal frequency fb) output from a data signal source 6. An optical filter 4 performs waveform creation on the phase-modulated data signal and creates an optical output signal.

An optical wave combiner 7 wavelength-multiplexes a plurality of such optical output signals output from each of the plural optical modulation processing sections 10 and outputs the wavelength-multiplexed signal to a transmission channel.

The operation of the optical transmitter according to the first embodiment and having the structure described above is explained next.

The function of all the optical modulation processing units 10 is the same. Hence, in the following description, the functioning of only one optical modulation processing unit 10 is described.

The laser light source 1 generates a light source signal of a carrier frequency fc.

The MZI optical modulator 2 may, for instance, be made of lithium niobate and may carry out a signal carrier-suppressed pulse modulation process by the method disclosed in, for instance, "320 Gbit/s (8×40 Gbit/s) WDM transmission over 367-km zero-dispersion-flattened line with 120-km repeater spacing using carrier-suppressed return-to-zero pulse format", Yutaka, Miyamaoto, et al., in postdeadline papers of Optical Amplifiers and Their Applications Topical Meeting, Jun. 11, 1999.

FIG. 2A to FIG. 2D are explanatory drawings that show the signal carrier-suppressed pulse modulation process carried out by the MZI optical modulator 2. FIG. 2A shows modulation characteristics of the MZI optical modulator 2. The MZI optical modulator 2 outputs a light signal of an intensity that is in accordance with the voltage applied to the clock signal.

Figure 2B:
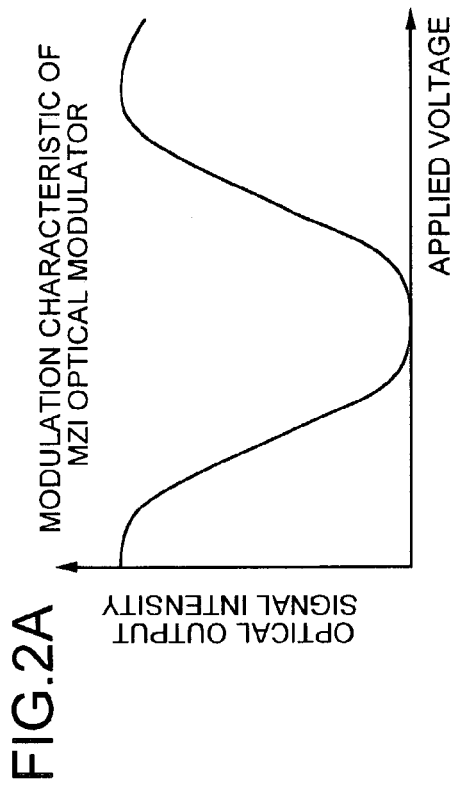
Figure 2C:
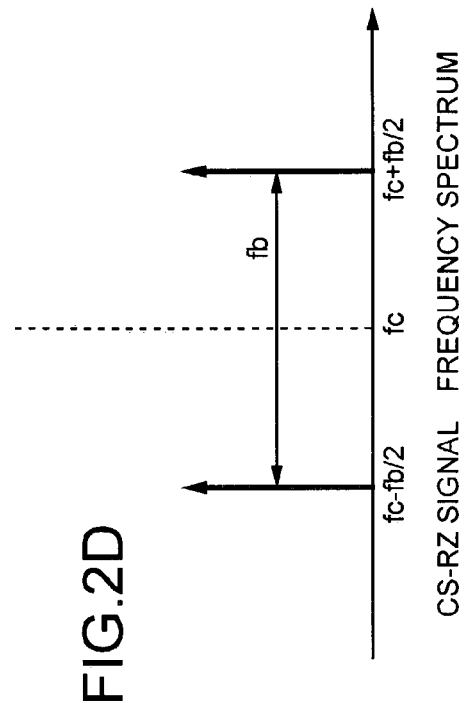
Figure 2D:
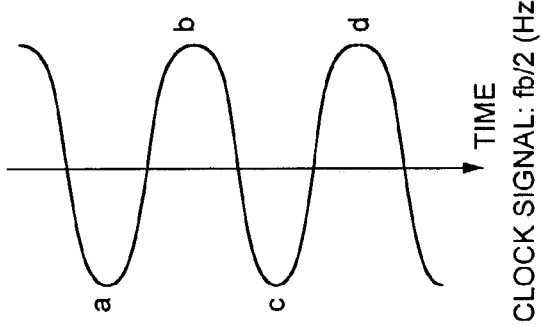

The clock signal source 5 generates and outputs, as shown in FIG. 2B, a clock signal that has a frequency (=fb/2) that is half of the signal frequency fb of the data signal that is to be transmitted, with the valley portion (the least applied voltage in FIG. 2A) of the quenching characteristic of the modulation characteristic.

The MZI optical modulator 2 modulates the light source signal fc by considering the clock signal as the applied voltage. After modulation the optical output signal appears as a CS-RZ signal that has an alternating phase, viz., 0, π, 0, π, . . . and so on.

To be specific, the clock signal (with a frequency of fb/2), at peak voltages a to d is modulated to a CS-RZ signal (see FIG. 2C) and is output at a frequency fb and with an alternating signal phase as 0, π, 0, π, . . . for the peak voltages a, b, c, and d, respectively.

The optical frequency spectrum (see FIG. 2D) of the CS-RZ signal, depending on the influence by the alternating signal phases 0 and π, will have two carrier frequencies, namely, fc−fb/2 and fc+fb/2. The frequency component fc of the light source signal is suppressed in the mutual offsetting of alternating signal phase components.

The optical phase modulator 3 inputs the data signal (with a signal frequency of fb) output from the data signal source 6 and performs optical phase modulation on the CS-RZ signal and converts it into a light source signal. As a result, the data signals 0 and 1 are converted to optical modulated signals with an optical phase of 0 and π, respectively.

Figure 3:
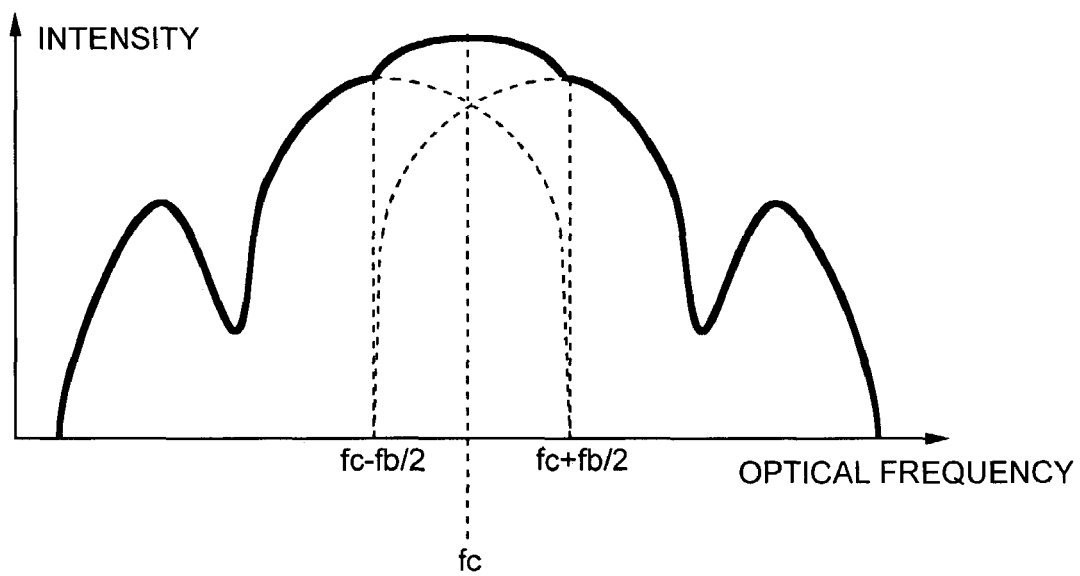
FIG. 3 is a view that shows a frame format of an optical frequency spectrum of an optical modulated signal in the first embodiment.

FIG. 3 is a view that shows a frame format of an optical frequency spectrum of the optical modulated signal. The two carrier frequency components (fc−fb/2 and fc+fb/2) of the CS-RZ signal are separately phase modulated. Consequently, the optical modulated signal output from the optical phase modulator 3 is made of two superimposed frequency spectrums that are offset by the central frequency fb.

The two frequency spectrums contain the same information signal components in the frequency bands below fc−fb/2 and above fc+fb/2, thereby loading the optical modulated signal with redundant frequency components.

Figure 4:
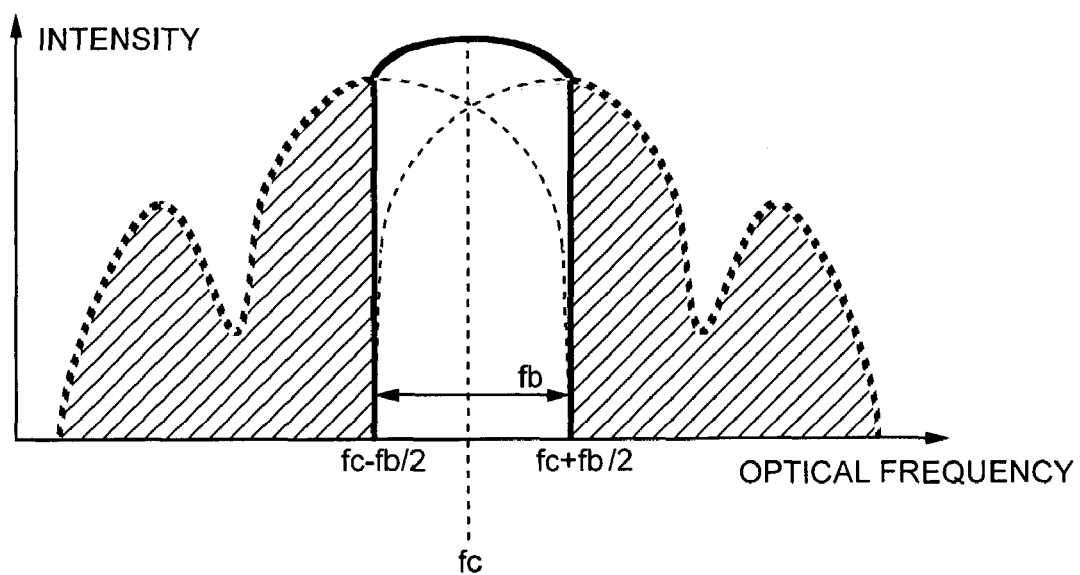
FIG. 4 is a view that shows a frame format of an optical frequency spectrum of an optical modulated signal after waveform formation process in the first embodiment.

The optical filter 4 removes the redundant frequency components from the optical modulated signal. FIG. 4 is a view that shows a frame format of an optical frequency spectrum of the optical modulated signal after waveform formation process. The optical filter 4 extracts only those frequency components that fall within the range of fc−fb/2 to fc+fb/2, suppresses all frequency components that are below fc−fb/2 and above fc+fb/2, and creates an optical output signal after waveform formation process. As a result, the bandwidth of the optical output signal is limited to fb.

Plurality of optical output signals output from plural optical modulation processing sections 10 are multiplexed in the optical wave combiner 7 and output to the transmission channel.

Figure 5A:
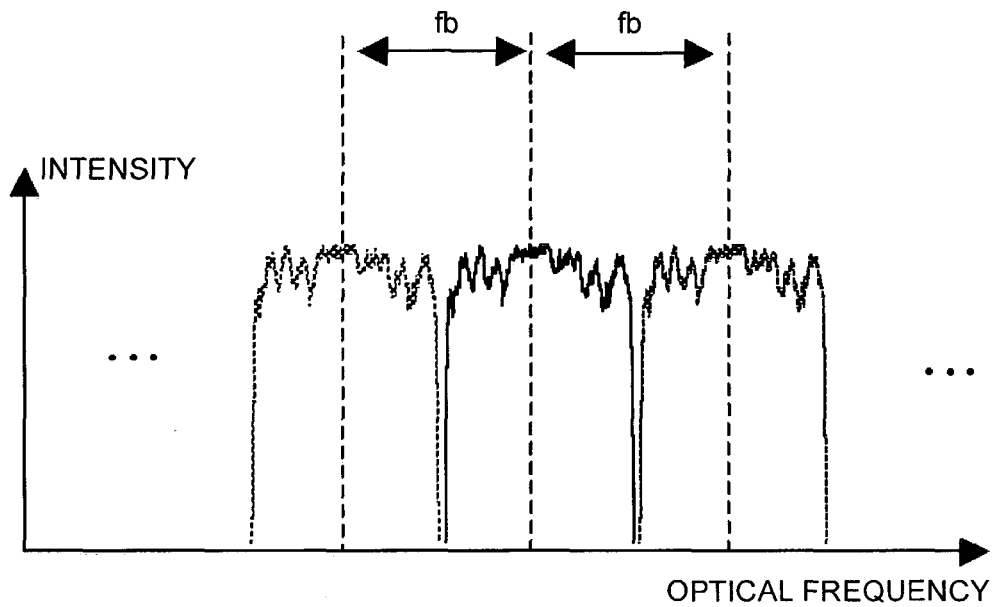
FIGS. 5A and 5B are view that show frame formats of wavelength-multiplexed optical signals in the first embodiment.

FIG. 5A is a view that shows a frame format of an optical frequency spectrum of an optical signal that is wavelength-multiplexed in the first embodiment. Each multiplexed optical output signal is confined to the frequency bandwidth fb. Therefore, even if a plurality of optical output signals are placed at a frequency interval fb, the spectrum of the optical output signals do not overlap. Consequently, the optical receiver receives each of the multiplexed optical output signals distinctly. The frequency usage efficiency in such an optical transmitter can logically be enhanced by up to 1.0 bit/s/Hz.

Figure 5B:
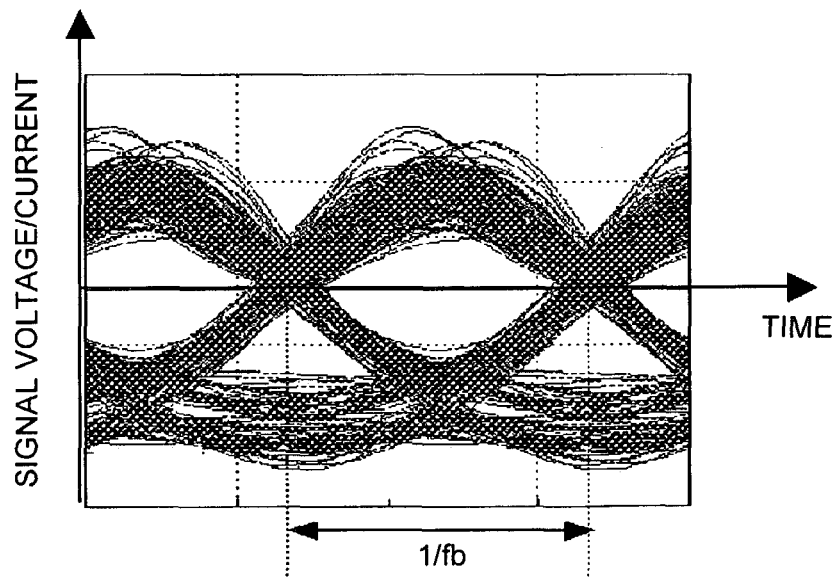

FIG. 5B is a view that shows a frame format of an eye pattern of the wavelength-multiplexed optical signal. Though the clear portions of the eye pattern are narrow due to suppression of redundant frequency components, the demodulation process that is carried out in the optical receiver widens the eye pattern openings (clear portions) sufficiently.

Figure 6:
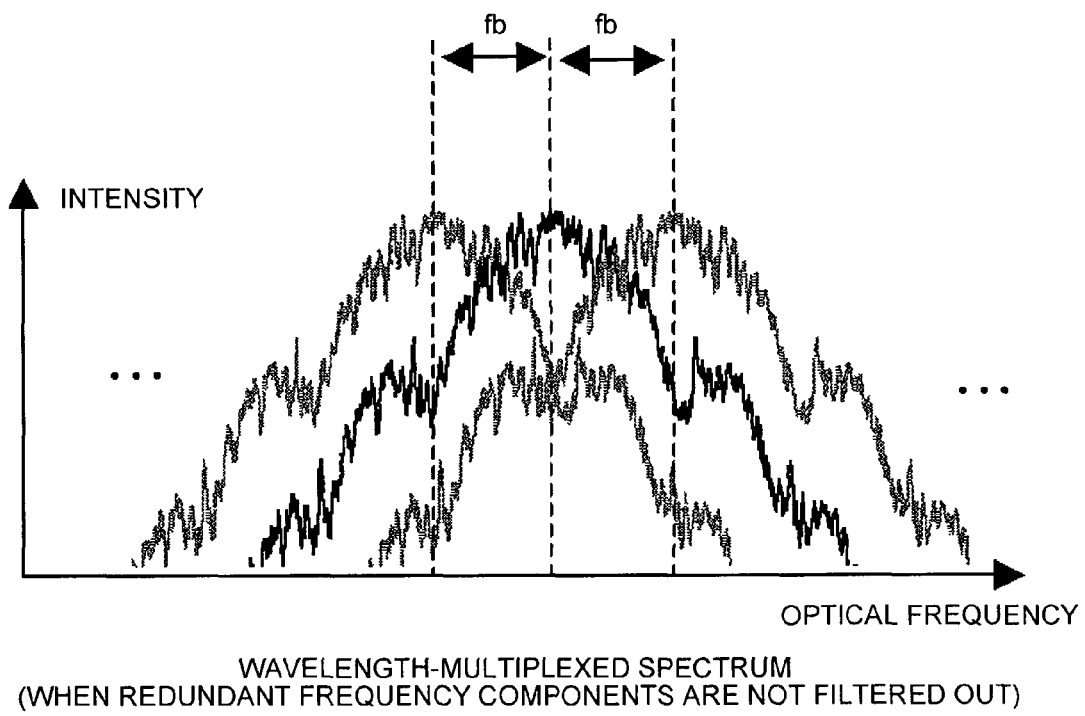
FIG. 6 is a view that shows a frame format of an optical signal that is wavelength-multiplexed by conventional methods.

In contrast, FIG. 6 is a view that shows a frame format of an optical spectrum of an optical signal that is wavelength-multiplexed without removing the redundant frequency components, as in conventional optical transmitters. As the frequency bandwidth of each of the optical output signals is wider than fb, the spectrums of the plurality of optical output signals, placed at a frequency interval fb, overlap and are not distinctly received in the optical receiver.

According to the first embodiment, the data signal is modulated according to the CS-RZ signal created by the MZI optical modulator. The frequency bandwidth of the modulated signal is narrowed in order to facilitate wavelength multiplexing. Consequently, the frequency usage efficiency is enhanced without compromising on the signal reception sensitivity.

In the first embodiment, an optical phase modulator is used for carrying out phase modulation of the data signal.

However, a lithium niobate MZI optical modulator may also be used for phase modulating the data signal.

Further, arrayed waveguide grating (AWG) may be used as the optical filter 4.

In the first embodiment, the CS-RZ signal output from the MZI optical modulator 2 is passed into the optical phase modulator 3 to phase modulate the data signal. However, the structure need not be limited to this and can be made such that after phase modulation of the data signal according to the light source signal from a laser light source, the modulated data signal is carrier-suppressed-pulse-modulated by the MZI optical modulator and passed through the optical filter to create a waveform.

In the first embodiment, the optical phase modulator 3 phase modulates the data signal according to the CS-RZ signal. In a second embodiment of the present invention, the optical transmitter includes a differential coder that performs differential coding to the data signal. The optical phase modulator 3 performs phase modulation on the differential-coded data signal according to the CS-RZ signal.

Since all other aspects of the second embodiment are identical to the first embodiment, only the features that are different in the second embodiment, namely, the differential-coding in the optical transmitter and demodulation in the optical receiver are explained next.

Figure 7:
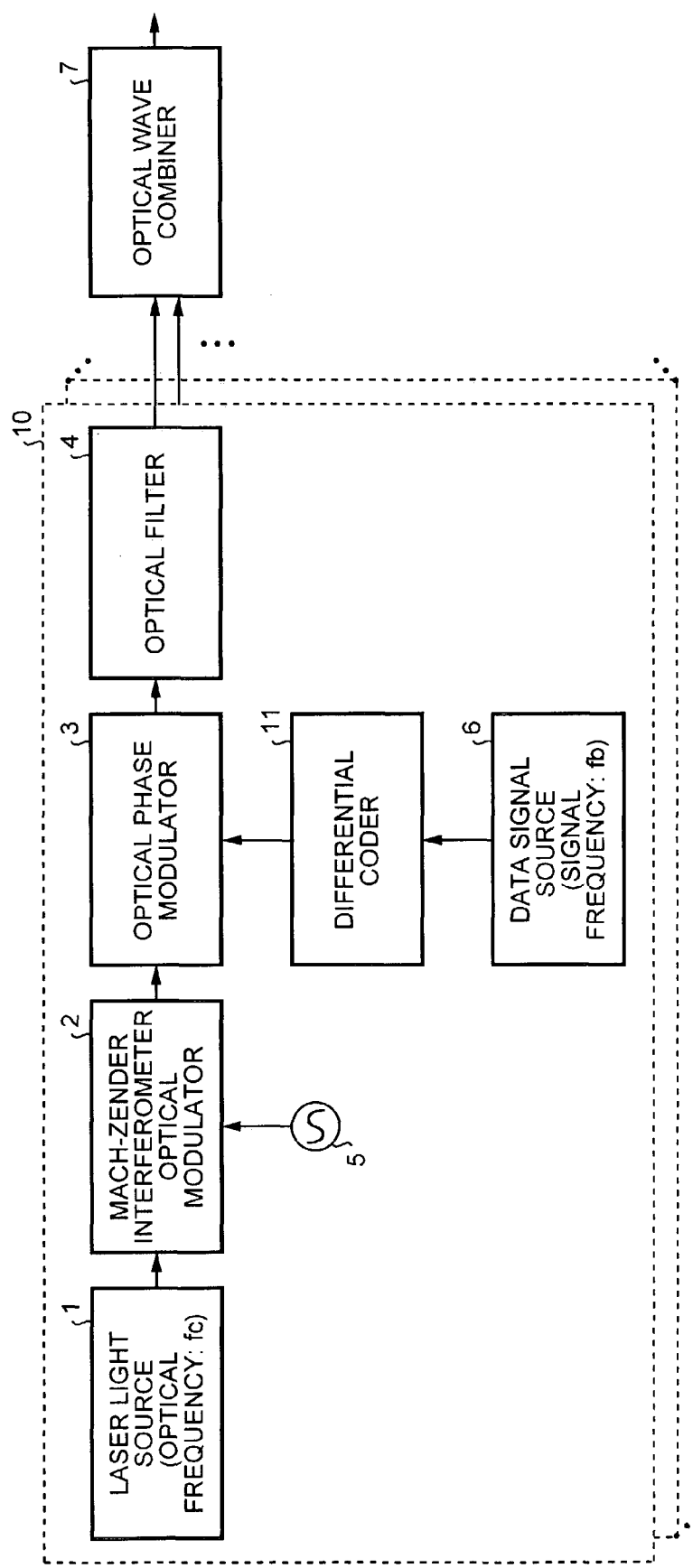
FIG. 7 is a schematic drawing of the optical transmitter according to a second embodiment of the present invention.

The operation of the second embodiment is explained with reference to FIG. 7.

In each of plurality of optical modulation processing sections 10, a data signal output from a data signal source 6 undergoes differential-coding by a differential coder 11. The differential-coded data signal enters an optical phase modulator 3 and is phase modulated according to a separately generated CS-RZ signal. The optical modulated signal passes through an optical filter that suppresses the redundant frequency components, and is subsequently multiplexed by an optical wave combiner 7, and transmitted to a transmission channel.

The optical receiver according to the second embodiment may, for instance, have the configuration disclosed in 'Optical Receiver Module for bit synchronous strong modulation DPSK-DD transmission system using PLC platform (Yamada et al., The Institute of Electronics, Information and Communication Engineers, Electronic Society Meeting papers, C-3-111, P237, 2000)' and performs delayed demodulation on the optical signal received from the optical transmitter.

Figure 8:
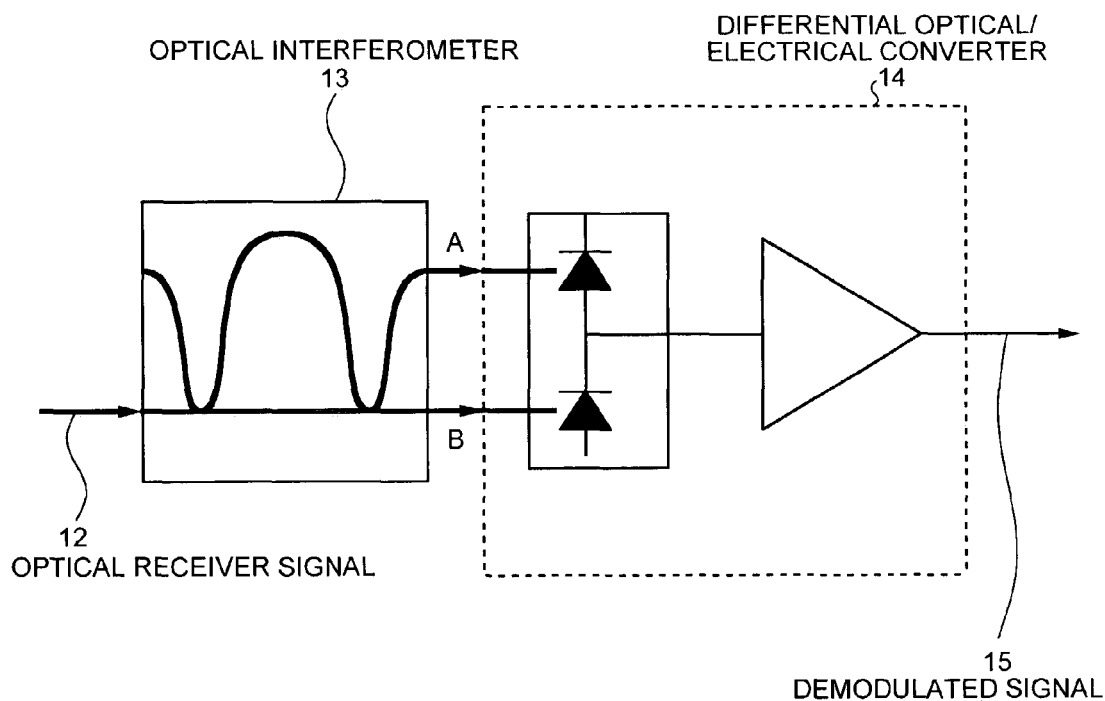
FIG. 8 is a schematic drawing of the optical receiver according to a second embodiment of the present invention.
Figure 9:
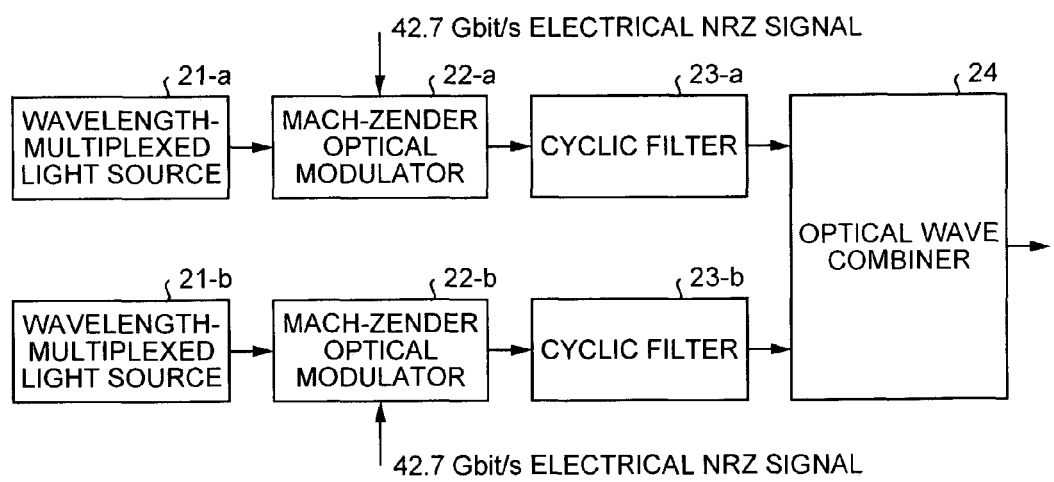
FIG. 9 is a schematic drawing of a conventional optical transmitter.
Figure 10A:
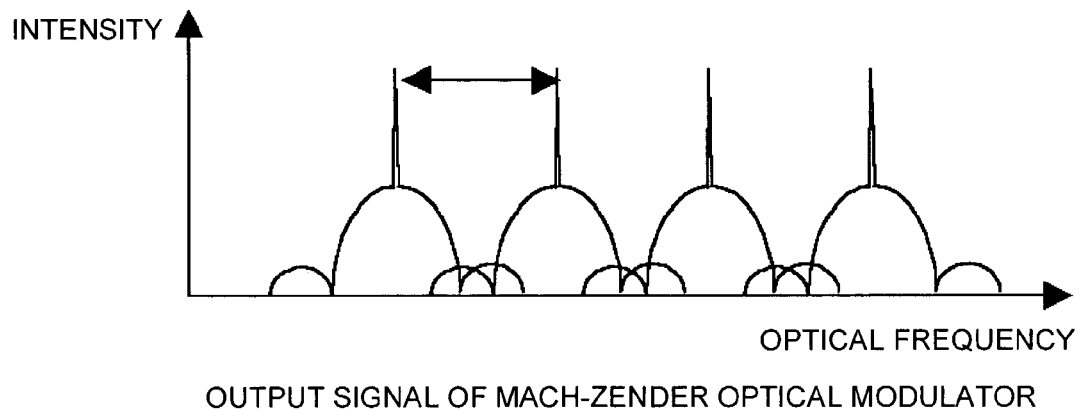
FIGS. 10A to 10C are schematic drawing for explaining a conventional wavelength-multiplexing process.
Figure 10B:
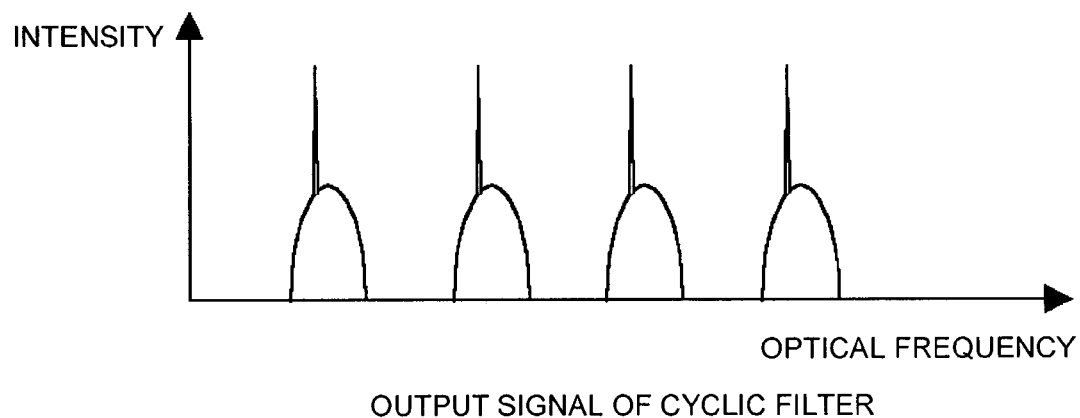
Figure 10C:
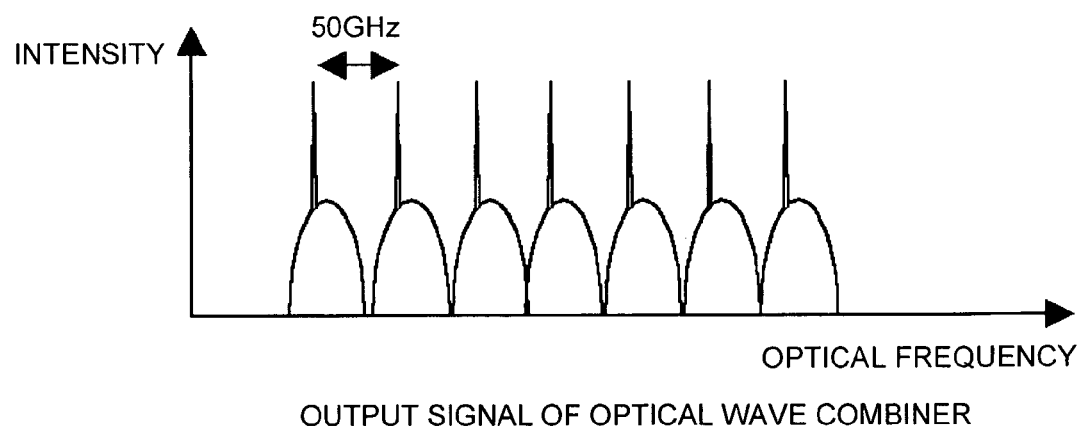

FIG. 8 is a schematic drawing of an optical receiver of the optical communications system according to a second embodiment of the present invention. In FIG. 8, an optical interferometer 13 creates an interference signal of an optical receiver signal 12 and a 1-bit time delay. A differential optical/electrical converter 14 converts the interference signal into a demodulated signal 15, which is an electrical signal.

The operation of the optical receiver according to the second embodiment is explained next with reference to FIG. 8.

The optical interferometer 13 distributes the optical receiver signal 12 between two arms. In one arm, a time delay of 1 bit is added to the optical receiver signal 12. For instance, if the signal frequency of the optical receiver signal 12 is 10 Gbit/s, a delay of 100 picoseconds (=$\frac{1}{10}$ Gbit) is added to the signal before it is output.

Meanwhile no delay is added to the optical receiver signal 12 in the other arm and the distributed component of the optical receiver signal 12 is directly output.

The optical interferometer 13 then combines the distributed components of the optical receiver signal 12 output from the two arms A and B and makes them undergo optical interference. As a result, when the phase of both distributed components are the same (0-0, $\pi$-$\pi$), demodulated pulse is output from port A, and when the phases of the two distributed components are reversed (0-$\pi$, 0-$\pi$), demodulated pulse is output from port B in FIG. 8.

The differential optical/electrical converter 14 converts the demodulated pulse output from port A and port B into electrical signals using an optical diode, calculates the difference between the two electrical signals, and outputs as a demodulated signal.

According to the second embodiment, as in the first embodiment, in the optical communications system, the frequency usage efficiency of the multiplexed optical signals can be enhanced. The optical transmitter performs differential-coding on the data to be transmitted and the optical receiver performs delayed demodulation on the optical reception signal. Consequently, the structure of the optical receiver can be simplified to a great extent.

According to the present invention, in the optical transmitter, a data signal is modulated according to a CS-RZ signal generated by signal carrier-suppressed pulse modulation process. The modulated data signal then passes through an optical filter where the bandwidth of the signal is confined. By the above processes, the effect of enhanced frequency usage efficiency of the multiplexed signal is achieved with minimal compromising on the signal reception sensitivity.

Moreover, a data signal is phase modulated and made to undergo signal carrier-suppressed pulse modulation and subsequently passed through an optical filter to confine its bandwidth. By the above processes, the effect of enhanced frequency usage efficiency of the multiplexed signal is achieved with minimal compromising on the signal reception sensitivity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmitter, comprising an optical modulation processing unit that includes:
   a signal carrier-suppressed pulse modulating unit that performs signal carrier-suppressed pulse modulation on a light source signal to thereby create a carrier-suppressed-return-to-zero signal;
   a phase modulating unit that performs phase modulation on a data signal based on the carrier-suppressed-return-to-zero signal to thereby convert the data signal into a phase-modulated signal; and
   an optical filtering unit that filters out redundant frequency components included in the phase-modulated signal,
   wherein the signal carrier-suppressed pulse modulating unit performs the signal carrier-suppressed pulse modulation based on a clock signal with a frequency, wherein the frequency of the clock signal is half of a signal frequency of the data signal, and creates the carrier-suppressed-return-to-zero signal such that peaks of an optical frequency spectrum are separated from each other by the signal frequency; and the optical filtering unit filters out all frequency components that fall outside a frequency band determined by the signal frequency.

2. The optical transmitter according to claim 1, wherein the optical modulation processing unit is provided in plurality and each optical modulation processing unit performs modulation on each of a plurality of data signals and creates an optical output signal, and the optical transmitter further comprises:

an optical combining unit that wavelength-multiplexes the optical output signals output from the optical modulation processing units.

3. The optical transmitter according to claim 1, wherein the optical modulation processing unit further includes a differential coding unit that performs differential-coding on the data signal.

4. The optical transmitter according to claim 1, wherein the signal carrier-suppressed pulse modulating unit is a Mach-Zender interferometer optical modulator.

5. An optical transmitter, comprising an optical modulation processing unit that includes:

a phase modulating unit that performs phase modulation on a data signal to thereby convert the data signal into a phase-modulated signal;

a signal carrier-suppressed pulse modulating unit that performs signal carrier-suppressed pulse modulation on the phase-modulated signal to thereby convert the phase-modulated signal into a phase modulated carrier-suppressed-return-to-zero signal; and an optical filtering unit that filters out redundant frequency components included in the phase modulated carrier-suppressed-return-to-zero signal, wherein the signal carrier-suppressed pulse modulating unit performs the signal carrier-suppressed pulse modulation based on a clock signal with a frequency, wherein the frequency of the clock signal is half of a signal frequency of the data signal, and creates the carrier-suppressed-return-to-zero signal such that peaks of an optical frequency spectrum are seperated from each other by the signal frequency; and the optical filtering unit filters out all frequency components that fall outside a frequency band determined by the signal frequency.

6. The optical transmitter according to claim 5, wherein the optical modulation processing unit is provided in plurality and each optical modulation processing unit performs modulation on each of a plurality of data signals and creates an optical output signal, and the optical transmitter farther comprises:

an optical combining unit that wavelength-multiplexes the optical output signals output from the optical modulation processing units.

7. The optical transmitter according to claim 5, wherein the optical modulation processing unit further includes a differential coding unit that performs differential-coding on the data signal.

8. The optical transmitter according to claim 5, wherein the signal carrier-suppressed pulse modulating unit is a Mach-Zender interferometer optical modulator.

9. A method for optical transmission, comprising:

performing signal carrier-suppressed pulse modulation on a light source signal to thereby create a carrier-suppressed-return-to-zero signal;

performing phase modulation on a data signal based on the carrier-suppressed-return-to-zero signal to thereby convert the data signal into a phase-modulated signal;

filtering out redundant frequency components included in the phase-modulated signal;

performing the signal carrier-suppressed pulse modulation based on a clock signal with a frequency, wherein the frequency of the clock signal is half of a signal frequency of the data signal, and creating the carrier-suppressed-return-to-zero signal such that peaks of an optical frequency spectrum are separated from each other by the signal frequency; and filtering out all frequency components that fall outside a frequency band determined by the signal frequency.

10. A method for optical transmission, comprising:

performing phase modulation on a data signal to thereby convert the data signal into a phase-modulated signal;

performing signal carrier-suppressed pulse modulation on the phase-modulated signal to thereby convert the phase-modulated signal into a phase modulated carrier-suppressed-return-to-zero signal;

filtering out redundant frequency components included in the phase modulated carrier-suppressed-return-to-zero signal;

performing the signal carrier-suppressed pulse modulation based on a clock signal with a frequency wherein the frequency of the clock signal is half of a signal frequency of the data signal, and creating the carrier-suppressed-return-to-zero signal such that peaks of an optical frequency spectrum are separated from each other by the signal frequency; and filtering out all frequency components that fall outside a frequency band determined by the signal frequency.

* * * * *